United States Patent [19]
Asai

[11] Patent Number: 5,768,701
[45] Date of Patent: Jun. 16, 1998

[54] INTERMITTENT RECEIVING CONTROL APPARATUS OF A SELECTIVE CALLING RECEIVER

[75] Inventor: Takayuki Asai, Tokyo, Japan

[73] Assignee: NEC Corporation, Tokyo, Japan

[21] Appl. No.: 598,995

[22] Filed: Feb. 9, 1996

[30] Foreign Application Priority Data

Feb. 9, 1995 [JP] Japan .................................. 7-021460

[51] Int. Cl.⁶ .................................................. H04B 1/16
[52] U.S. Cl. ........................................ 455/343; 455/38.3
[58] Field of Search ................................. 455/38.1, 38.2, 455/38.3, 343; 370/311, 312, 313; 340/825.44

[56] References Cited

U.S. PATENT DOCUMENTS

| | | | |
|---|---|---|---|
| 4,369,443 | 1/1983 | Giallanza et al. | 340/825.44 |
| 5,296,849 | 3/1994 | Ide | 455/343 |
| 5,384,564 | 1/1995 | Wycoff et al. | 455/343 |
| 5,535,427 | 7/1996 | Miyashita et al. | 455/38.2 |
| 5,587,706 | 12/1996 | Branner et al. | 455/38.2 |
| 5,638,054 | 6/1997 | Davis et al. | 455/343 |
| 5,649,315 | 7/1997 | Eaton | 455/343 |

FOREIGN PATENT DOCUMENTS 57-44344  3/1982  Japan .

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas, PLLC

[57] ABSTRACT

An intermittent receiving control apparatus of a selective calling receiver includes a timer for timing a current time instance, a memory for storing a frame number of a frame into which a selective call number is inserted and a frame number of a frame into which a common call number is inserted, a receiving frame number determination portion for outputting the frame number of the frame containing the selective call number and the frame number of the frame containing the common call number within a predetermined time range and outputting the frame number of the frame containing the selective call number outside the predetermined time range and a battery saving signal generator for generating a battery saving signal for turning a radio portion on when the frame having the frame number output by the receiving frame number determination portion is received.

10 Claims, 4 Drawing Sheets

| FRAME NUMBER | BIT LENGTH (X) |
|---|---|
| 0 | 1 |
| 1 | 65 |
| 2 | 129 |
| 3 | 193 |
| 4 | 257 |
| 5 | 321 |
| 6 | 385 |
| 7 | 449 |

INTERMITTENT RECEIVING CONTROL APPARATUS OF A SELECTIVE CALLING RECEIVER

BACKGROUND OF THE INVENTION

The present invention relates to a selective calling receiver and, particularly, to an intermittent receiving control apparatus of a selective calling receiver.

A selective calling receiver (referred to as "receiver" hereinafter) has a selective call number for selectively calling the receiver and turns a radio portion thereof on upon a reception of a radio signal having a frame into which the selective call number thereof is inserted and off when a radio signal which does not contain the selective call number is received. Such intermittent on/off operation of the radio portion of the receiver is called as an "intermittent receiving control" for the purpose of improving the battery saving efficiency.

An example of a receiver having the intermittent receiving control is disclosed in Japanese Patent Application Laid-open No. S57-44344 laid-open on Mar. 12, 1982.

The laid-open receiver is provided with a timer setting portion for setting a time period for which a radio signal is received and, within the time period, a radio portion thereof is turned on with a timing of reception of a frame of the radio signal into which a selective call number thereof is inserted. Outside the time period, the radio portion is not turned on even when a radio signal having a frame containing the selective call number thereof is received.

Since the radio portion of the receiver is always turned off outside the time period set by the timer setting portion as mentioned, the battery saving efficiency thereof is very high.

However, since a recent receiver has, in addition to its own selective call number, a common call number for calling a plurality of receivers simultaneously, a radio portion thereof is turned on upon reception of a radio signal having a frame into which its own selective call number is inserted and a radio signal having a frame into which the common call number is inserted within a time period set by a timer setting portion thereof. Therefore, the battery saving efficiency thereof is low when compared with the receiver having no common call number.

SUMMARY OF THE INVENTION

An object of the present invention is to provide an intermittent receiving control apparatus with which the battery saving efficiency of a selective calling receiver having at least two calling numbers can be improved.

Another object of the present invention is to provide an intermittent receiving control apparatus which selects one of at least two calling numbers of a selective calling receiver which becomes effective.

Another object of the present invention is to provide an intermittent receiving control apparatus which selects one of at least two calling numbers of a selective calling receiver which becomes effective by assigning a time period.

In order to achieve the above-mentioned objects, a selective calling receiver according to the present invention includes a first memory for storing a plurality of calling numbers, a receiving circuit for receiving a radio signal, a detector for detecting a calling number from the radio signal received by the receiving circuit, a decision circuit for deciding whether or not any one of the plurality of the calling numbers stored in the first memory coincides with the calling number detected by the detector, an alarm portion for alarming calling information when a coincidence is decided in the decision, a selector for selecting some of the calling numbers from the plurality of the calling numbers stored in the first memory within a predetermined time period and a control portion for turning the receiving circuit on at times at which the calling numbers selected by the selector are received.

With the construction of the receiver mentioned above, in which the receiving circuit is turned on at the timing of reception of only a limited number of calling numbers within the predetermined time period, it is possible to improve the battery saving efficiency of the receiver.

BRIEF DESCRIPTION OF THE DRAWINGS

These and other objects, features and advantages of the present invention will become more fully apparent from the following detailed description taken in conjunction with the accompanying drawings.

DETAILED DESCRIPTION OF THE PREFERRED EMBODIMENTS

Figures 1, 2:
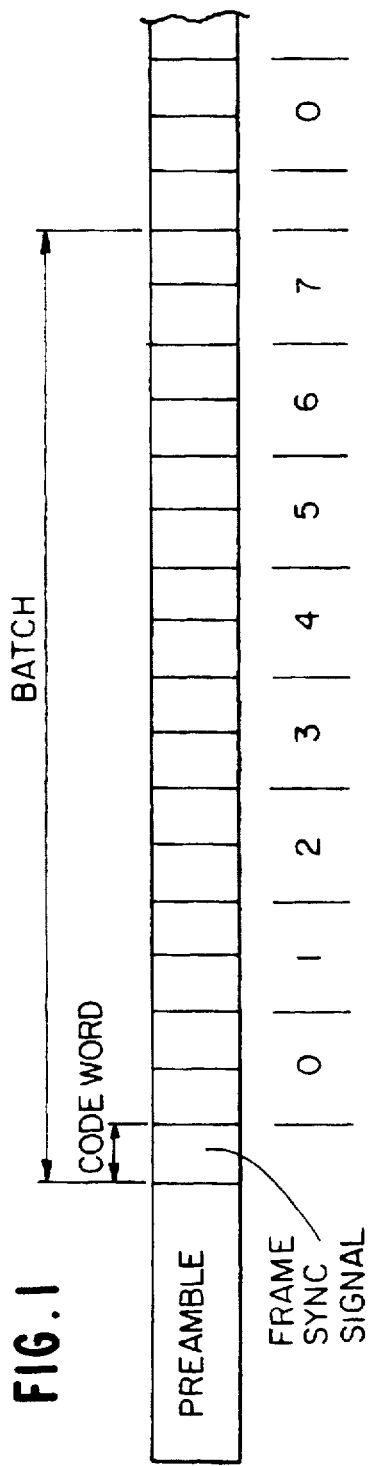
FIG. 1 shows a signal format of a POCSAG signal which is an example of a radio signal to be received by a selective calling receiver according to the present invention.
FIG. 2 illustrates a bit length of first bits of respective frames measured from a last bit of a frame sync signal of the POCSAG signal shown in FIG. 1.

In FIG. 1, a POCSAG signal inlludes preamble signals each of which is a 576 bit signal composed of a repetition of "1" and "0". The preamble signal is to synchronizing in bit an operation of a selective calling receiver with a radio signal and followed by a batch composed of frame sync signals each followed by frames numbered "0" to "7". After 10 batches are transmitted, a next preamble signal is transmitted.

The frame sync signal is composed of a codeword having a 32-bit structure and functions to perform a frame synchronization between the operation of the selective calling receiver and the radio signal. The frame sync signal is followed by the frame 0 which is composed of 2 codewords into each of which a calling number of a message signal is inserted. The frames 0 to 7 have the same construction and each batch is constructed with the frames 0 to 7 arranged in the order.

In FIG. 2, a first bit of the frame 0 is located 1 bit after a last bit of the frame sync signal and a first bit of the frame 1 is located 65 bits after the last bit of the frame sync signal. Similarly, a bit length x between a first bit of the frame numbered n, where n is an integer from 0 to 7, to the last bit of the frame sync signal is represented by the following equation:

$$x = 1 + 64*n$$

Figure 3:
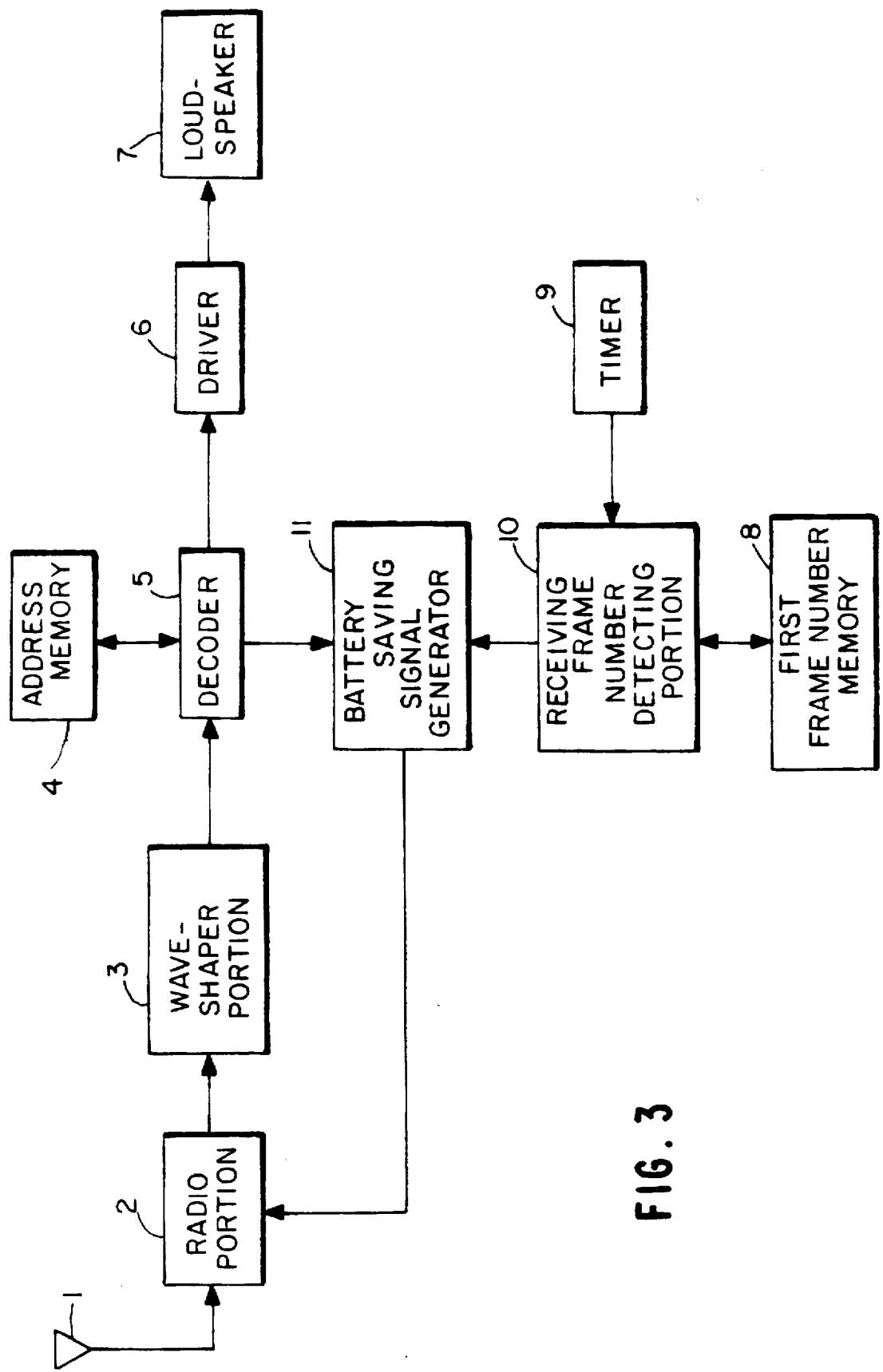
FIG. 3 is a block diagram of a control apparatus of a selective calling receiver according to an embodiment of the present invention.

In FIG. 3, an antenna 1 receives a radio signal from a base station which is not shown and outputs a received signal to a radio portion 2. The radio portion 2 is controlled to be turned on by a high level battery saving signal. The radio portion 2 amplifies the received signal supplied from the antenna 1, demodulates it and supplies the demodulated signal to a wave-shaper portion 3. The wave-shaper portion 3 wave-shapes the demodulated signal to a digital signal and supplies the digital signal to a decoder 5.

An address memory 4 stores a selective calling number and a common calling number and outputs either of the selective calling number or the common calling number to the decoder 5 according to an address assigned by the decoder 5.

The decoder 5 detects a frame sync signal from the digital signal by decoding the latter and outputs the detected sync signal to a battery saving signal generator 11. Further, the decoder 5 detects a selective calling number or a common calling number from the digital signal by decoding the latter and outputs a coincidence signal to a driver 6 and the battery saving signal generator portion 11 when the detected selective calling number or the detected common calling number is coincident with the selective calling number or the common calling number stored in the address memory 4.

The driver 6 amplifies the coincidence signal current and outputs a drive signal. A loud speaker 7 is driven by the drive signal and generates call information.

A first frame number memory 8 stores a first frame number of a predetermined frame into which a selective calling number is inserted and a second frame number of a predetermined frame into which a common calling number is inserted and outputs the first and second frame numbers to a receiving frame number determining portion 10.

A timer 9 provides a current time instance and output it to the receiving frame number determining portion 10.

The receiving frame number determining portion 10 outputs the first and second frame numbers supplied from the first frame number memory 8 to the battery saving signal generator 11 within a predetermined time period and outputs only the first frame number to the battery saving signal generator 11 outside the predetermined time period.

The battery saving signal generator 11 outputs a battery saving signal to the radio portion 2. A level of the battery saving signal is high or low according to the sync signal, the coincidence signal from the decoder 5 and the frame number supplied from the receiving frame number determining portion 10.

An operation of the control device shown in FIG. 3 will now be described.

Assuming that a bit synchronization and a frame synchronization are established between the selective calling receiver and a radio signal, the battery saving signal generator 11 outputs a high level battery saving signal to the radio portion 2 to cause the latter to be turned on when the selective calling receiver receives the sync signal. When the radio portion 2 is turned on by the high level battery saving signal, a receiving signal from the antenna 1 is amplified and demodulated by the radio portion 2 and the demodulated signal is supplied to the wave-shaper portion 3. The demodulated signal is converted into a digital signal by the wave-shaper portion 3 and the digital signal is supplied to the decoder 5. The digital signal is decoded by the decoder 5 which detects the sync signal from the decoded digital signal and supplies the detected sync signal to the battery saving signal generator 11. In response to the detected sync signal, the battery saving signal generator 11 outputs a low level battery saving signal to the radio portion 2 to cause the latter to be turned off.

On the other hand, the timer 9 supplies a current time which is supplied to the receiving frame number determining portion 10. Upon a reception of the current time supplied from the timer 9, the receiving frame number determining portion 10 determines whether or not the current time is within the predetermined time period. When the current time is within the predetermined time period, the receiving frame number determining portion 10 inputs the first and second frame numbers by assigning addresses of the first frame number memory 8 and supplies them to the battery saving signal generator 11. When it is determined by the receiving frame number determining portion 10 that the current time is outside the predetermined time period, the receiving frame number determining portion 10 reads the first frame number by assigning an address of an internally provided memory (to be described later) and outputs the first frame number to the battery saving signal generator 11.

Upon reception of the sync signal detected by the decoder 5, the battery saving signal generator 11 outputs the high level battery saving signal to the radio portion 2 at a time when a bit length between the sync signal and the frame having the first frame number from the receiving frame number determining portion 10 is measured.

When the high level battery saving signal is input to the radio portion 2, the latter is turned on, so that the receiving signal from the antenna 1 is amplified and demodulated by the radio portion 2 and the demodulated signal is supplied to the wave-shaper portion 3. The demodulated signal is converted into the digital signal by the wave-shaper portion 3 and supplied to the decoder 5. The digital signal is decoded by the decoder 5 and, when the selective call number or the common call number which is stored in the address memory 8 is detected from the decoded signal, the coincidence signal is outputs from the decoder 5 to the driver 6 and the battery saving signal generator 11. The coincidence signal input to the driver 6 is amplified and output to the loudspeaker 7 as a drive signal. The loudspeaker 7 is driven by the drive signal to alarm call information.

The battery saving signal generator 11 responds to the coincidence signal from the decoder 5 to output a low level battery saving signal to the radio portion 2 to thereby turn the radio portion 2 off.

Now, the operation of the receiving frame number determining portion 10 shown in FIG. 3 will be described with reference to the functional block diagram shown in FIG. 4.

Figure 4:
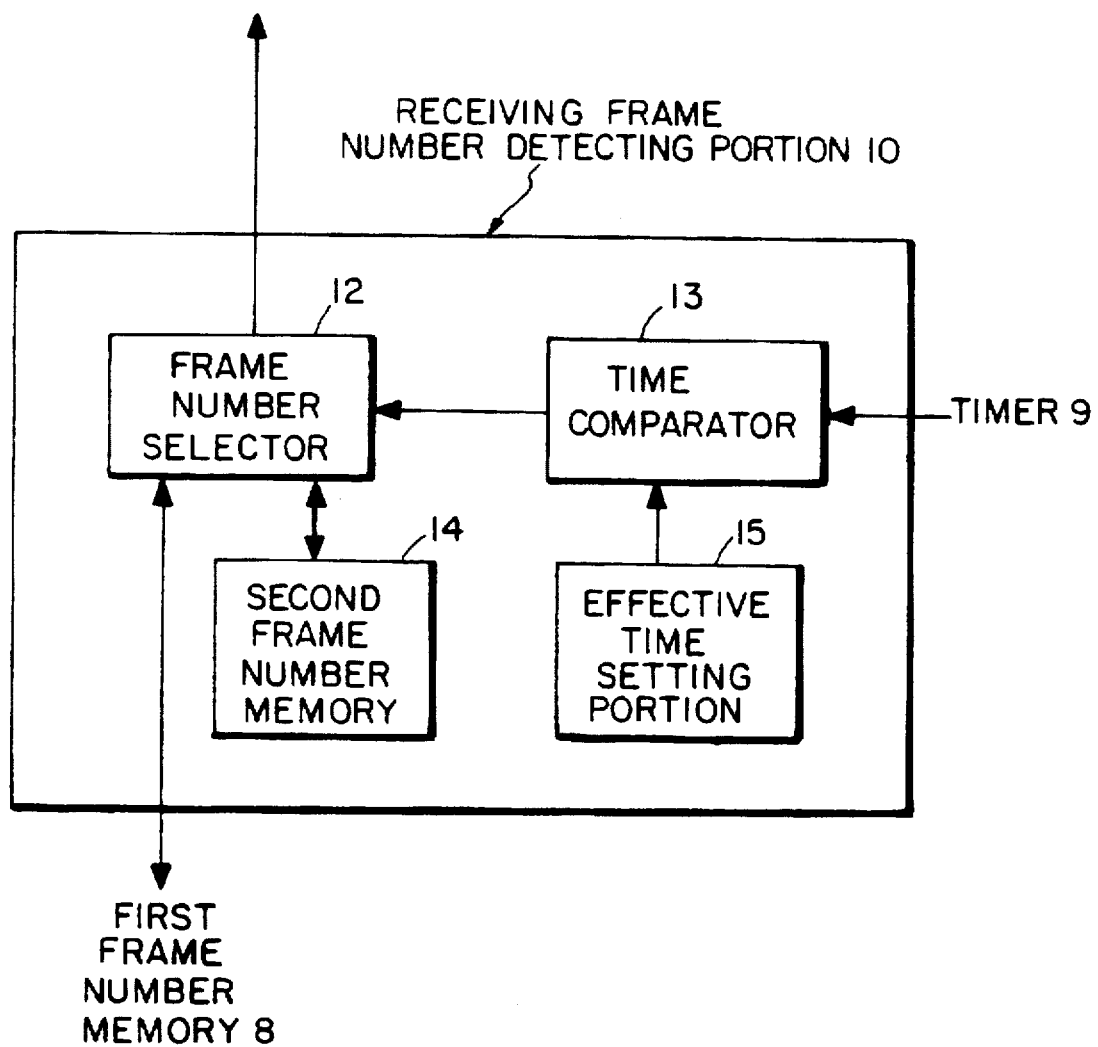
FIG. 4 is a block diagram of an example of a receiving frame number decision portion shown in FIG. 3.

In FIG. 4, the receiving frame number determining portion 10 includes a frame number selector 12, a time comparator 13, a second frame number memory 14 and an effective time setting portion 15.

The effective time setting portion 15 outputs a time setting signal indicative of a predetermined time range to the time comparator 12. The effective time setting portion 15 may be constructed such that the time range can be arbitrarily set by a user of the selective calling receiver or preliminarily set on the side of a service offerer. The time comparator 13 compares a current time from the timer 9 with a time setting signal from the effective time setting portion 15 to determine whether or not the current time is within a predetermined time range assigned by the time setting signal. The time comparator 13 outputs a high level selection signal to the frame number selector 12 when the current time instance is within the predetermined time range and a low level selection signal to the frame number selector 12 when the current time instance is outside the predetermined time range. The frame number selector 12 responds to the high level selection signal to read the first and second frame numbers by assigning addresses of the first frame number memory 8 and supplies them to the battery saving signal generator 11. The frame number selector 12 responds to the low level selection signal to read the first frame number by assigning an address of the second frame number memory 14 and supplies them to the battery saving signal generator 11. The frame number selector 12 is constructed with a selector.

Next, an operation of the battery saving signal generator 11 shown in FIG. 3 will be described with reference to the functional block diagram shown in FIG. 5.

Figure 5:
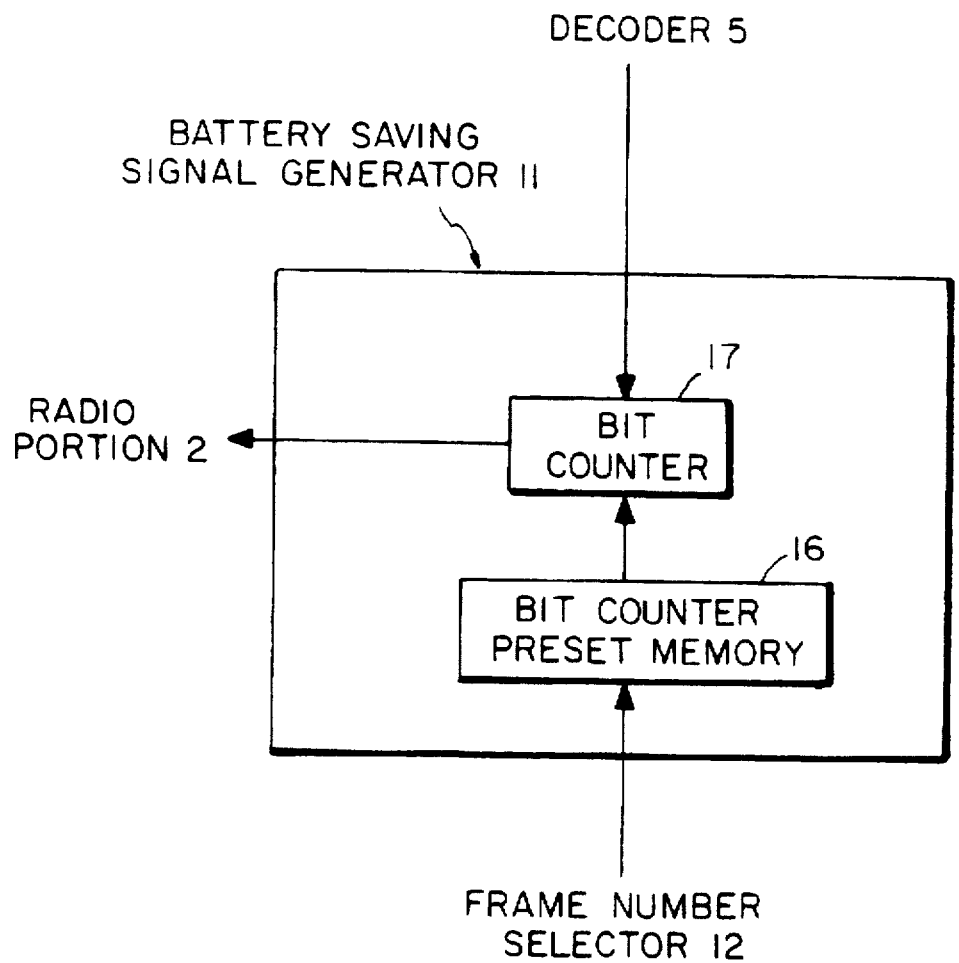
FIG. 5 is a block diagram of an example of a battery saving signal generator shown in FIG. 3.

In FIG. 5, the battery saving signal generator 11 includes a bit counter preset memory 16 and a bit counter 17.

The counter preset memory 16 uses the frame number from the frame number selector 12 as an address and outputs a counter preset signal indicative of a bit length between the frame having the frame number and the sync signal to the bit counter 17. The bit counter 17 responds to the sync signal detected by the decoder 5 to set the bit length indicated by the counter preset signal from the counter preset memory 16. The bit length thus set is counted down by the bit counter 17 and, when the count value of the bit counter 17 becomes "0", the bit counter 17 outputs a high level battery saving signal to the radio portion 2.

The battery saving signal generator 11 operates to supply the high level battery saving signal to the radio portion 2 during a time period in which the decoder 5 detects the sync signal. Since, this operation of the battery saving signal generator is well known, details thereof are omitted here for simplicity of description. Further, although the battery saving signal generator 11 outputs the low level battery saving signal to the radio portion 2 at a time when the reception of the sync signal terminates and at a time when the reception of the frame to be received terminates, this operation is well known and details thereof are omitted here.

Although, in this embodiment, the selective calling receiver having no display portion has been described as an example, it is, of course, possible to use the control apparatus of the present invention in a selective calling receiver capable of displaying a message.

Further, although, in this embodiment, the signal format of the radio signal to be received by the selective calling receiver has been described as that of the POCSAG signal, the present invention can be applied to other signal format of such as the NTT system signal or the ERMES signal.

Further, in this embodiment, the present invention has been described as applied to the selective calling receiver receiving both the selective call number and the common call number. However, the present invention is not limited to this and can be applied to a selective calling receiver which receives three or more call numbers.

Further, although the present invention has been described as being applied to the selective calling receiver which receives the selective call number and the common call number within the predetermined time range and receives only the selective call number outside the predetermined time range, the present invention can be applied to a selective calling receiver which receives the selective call number within the predetermined time range and receives both the selective call number and the common call number outside the predetermined time range.

In a case where the present invention is applied to a selective calling receiver which receives three or more call numbers, it is possible to construct the present invention such that an effective time range is set for every call number.

As described hereinbefore, the control apparatus according to the present invention controls the selective calling receiver which receives the selective call number and the common call number does not receive the common call number outside the predetermined time range. Therefore, it is possible to improve the battery saving efficiency.

Obviously, numerous additional modifications and variations of the present invention are possible in light of the above teachings. It is, therefore, to be understood that within the scope of the appended claims, the present invention may be practiced otherwise than as specifically described herein.

What is claimed is:

1. An intermittent receiving control apparatus comprising:
   first memory means for storing a plurality of call numbers;
   receiving means for receiving a radio signal;
   detection means for detecting call numbers from the radio signal received by said receiving means;
   determination means for determining whether or not the call numbers detected by said detection means coincide with any of the call numbers stored in said first memory means;
   alarming means for alarming call information when a coincidence is detected by said determination means;
   selector means for selecting at least one of the call numbers stored in said first memory means within a predetermined time range; and
   control means for turning said receiving means on with a timing of reception of the call number selected by said selector means, wherein said selector means comprises:
   timer means for timing a current time, and
   call number determination means for outputting at least one of the call numbers stored in said first memory means when a time instance timed by said timer means is within said predetermined time range and outputting all of the call numbers stored in said first memory means when the time instance timed by said timer means is outside the predetermined timer range, and further wherein said call number determination means comprises:
      time setting means for setting the predetermined time range;
      time comparator means for comparing the current time from said timer means with the predetermined time range set by said time setting means and outputting a selection signal when the current time is within the predetermined time range;
      second memory means for storing at least one of the plurality of the call numbers stored in said first memory means; and
      output means responsive to the selection signal for outputting either of the call number output from said first memory means of the call number output from said second memory means.

2. An intermittent receiving control apparatus comprising:
   first memory means for storing a plurality of call numbers:
   receiving means for receiving a radio signal;
   detection means for detecting call numbers from the radio signal received by said receiving means;
   determination means for determining whether or not the call numbers detected by said detection means coincide with any of the call numbers stored in said first memory means;
   alarming means for alarming call information when a coincidence is detected by said determination means;
   selector means for selecting at least one of the call numbers stored in said first memory means within a predetermined time range; and
   control means for turning said receiving means on with a timing of reception of the call number selected by said selector means, wherein the radio signal is a POCSAG signal, and further wherein said control means comprises:

third memory means for storing bit lengths between a frame sync signal contained in the POCSAG signal and first bits of respective frames contained in the POCSAG signal and outputting the bit lengths with the call number output from said receiving all number determination means as addresses; and counter means for counting the bit length from said third memory means down when the frame sync signal is detected and outputting a battery saving signal of high level when the count becomes "0" to turn said radio means on.

3. An intermittent receiving control apparatus comprising:

first memory means for storing a plurality of call numbers;

receiving means for receiving a radio signal;

detection means for detecting call numbers from the radio signal received by said receiving means;

determination means for determining whether or not the call numbers detected by said detection means coincide with any of then call numbers stored in said first memory means;

alarming means for alarming call information when a coincidence is detected by said determination means;

selector means for selecting at least one of the call numbers stored in said first memory means within a predetermined time range; and control means for turning said receiving means on with a timing of reception of the call number selected by said selector means, wherein said selector means comprises:

timer means for timing a current time, and call number determination means for outputting at least one of the call numbers stored in said first memory means when a time instance timed by said timer means is within said predetermined time range and outputting all of the call numbers stored in said first memory means when the time instance timed by said timer means is outside the predetermined timer range, and further wherein said call number determination means comprises:

time setting means for setting the Predetermined time range;

time comparator means for comparing the current time from said timer means with the predetermined time range set by said time setting means and outputting a selection signal when the current time is within the redetermined time range;

second memory means for storing at least one of the plurality of the call numbers stored in said first memory means; and output means responsive to the selection signal for outputting either of the call number output from said first memory means-of the call number output from said second memory means, and further wherein said second memory means is adapted to store a selective call number for selectively calling said selective calling receiver.

4. An intermittent receiving control apparatus of a selective calling receiver, comprising:

first memory means for storing a plurality of call numbers;

receiving means for receiving a radio signal;

detection means for detecting call numbers from the radio signal received by said receiving means;

determination means for determining whether or not the call numbers detected by said detection means coincide with any of the call numbers stored in said first memory means;

alarming means for alarming call information when a coincidence is detected by said determination means;

timer means for timing a current time;

time setting means for setting a predetermined time range;

time comparator means for comparing the current time from said timer means with the predetermined time range set by said time setting means and outputting a selection signal when the current time is within the predetermined time range;

second memory means for storing at least one of the plurality of the call numbers stored in said first memory means;

third memory means for storing frame numbers of the frames of the radio signal into which the plurality of the call numbers stored in said first memory means are inserted;

output means responsive to the selection signal for outputting either of the frame number output from said second memory means or the frame number output from said third memory means; and control means for turning said radio means on when the call number selected by said output means is received.

5. The intermittent receiving control apparatus as claimed in claim 4, wherein the radio signal is a POCSAG signal.

6. The intermittent receiving control apparatus as claimed in claim 5, wherein said control means comprises:

fourth memory means for storing bit lengths between a frame sync signal contained in the POCSAG signal and first bits of respective frames contained in the POCSAT signal and outputting the bit lengths with the call number output from said receiving call number determination means as addresses; and counter means for counting the bit length from said third memory means down when the frame sync signal is detected and outputting a battery saving signal of high level when the count becomes "0" to turn said radio means on.

7. The intermittent receiving control apparatus as claimed in claim 4, wherein said first and third memory means are adapted to store a selective call number for said selective calling receiver and a common call number for calling the plurality of the selective calling receivers simultaneously, respectively.

8. The intermittent receiving control apparatus as claimed in claim 4, wherein said second memory means stores a call number for selectively calling said selective calling radio receiver.

9. An intermittent receiving control method for a selective calling receiver, comprising the steps of:

receiving a POCSAG signal by means of a radio circuit;

detecting a call number from the POCSAG signal;

determining whether or not the detected call number coincides with any of a plurality of call numbers stored in said selective calling receiver;

alarming a call information when there is a coincidence detected in the determining step;

timing a current time instance;

setting a predetermined time range;

comparing the current time instance with the predetermined time range;

selecting at least one of a plurality of frames into which the plurality of the call numbers are inserted, according to a result of the comparison;

outputting a frame number of the selected frame; and controlling said radio circuit when the frame having the output frame number is received, such that said radio circuit is turned on.

10. The intermittent receiving control method as claimed in claim 9, wherein said control step comprises the steps of:

detecting a frame sync signal contained in the POCSAG signal;

counting down bit lengths between the frame sync signal and first bits of respective frames contained in the POCSAG signal, held in a counter, in response to the detection of the frame sync signal; and controlling said radio circuit when the count value of said counter becomes "0", such that said radio circuit is turned on.

* * * * *